(12) United States Patent
Feller

(10) Patent No.: US 8,408,071 B1
(45) Date of Patent: Apr. 2, 2013

(54) ENHANCED VORTEX-SHEDDING FLOWMETER

(75) Inventor: Murray F Feller, Micanopy, FL (US)

(73) Assignee: Onicon Inc., Clearwater, FL (US)

( * ) Notice: Subject to any disclaimer, the term of this patent is extended or adjusted under 35 U.S.C. 154(b) by 92 days.

(21) Appl. No.: 13/235,696

(22) Filed: Sep. 19, 2011

(51) Int. Cl.
*G01F 1/32* (2006.01)

(52) U.S. Cl. .................................... 73/861.23

(58) Field of Classification Search .. 73/861.22–861.24, 73/861.28
See application file for complete search history.

(56) References Cited

U.S. PATENT DOCUMENTS

| | | | | |
|---|---|---|---|---|
| 4,186,599 A | * | 2/1980 | Frick | 73/861.28 |
| 4,297,898 A | * | 11/1981 | Herzl | 73/861.22 |
| 4,307,619 A | * | 12/1981 | Herzl | 73/861.24 |
| 4,320,650 A | * | 3/1982 | Kita | 73/861.22 |
| 4,380,935 A | * | 4/1983 | Sgourakes et al. | 73/861.24 |
| 4,457,181 A | * | 7/1984 | Marsh | 73/861.22 |
| 4,476,728 A | * | 10/1984 | Otani | 73/861.22 |
| 4,970,902 A | | 11/1990 | Misumi et al. | |
| 5,152,181 A | * | 10/1992 | Lew | 73/861.02 |
| 5,861,556 A | * | 1/1999 | Nukui et al. | 73/204.17 |
| 6,422,093 B2 | | 7/2002 | Feller | |
| 6,457,371 B1 | | 10/2002 | Feller | |
| 6,508,134 B1 | | 1/2003 | Feller | |
| 6,651,511 B1 | * | 11/2003 | Young | 73/861.08 |

\* cited by examiner

*Primary Examiner* — Jewel V Thompson
(74) *Attorney, Agent, or Firm* — David Kiewit

(57) ABSTRACT

A vortex-shedding flowmeter uses two flow obstacles to provide stable generation of vortices that are detected as they pass through an ultrasonic beam between two transducers. The deleterious effects of acoustic signals reflected from the obstacles are minimized both structurally and electronically. The shapes of the obstacles are selected to reflect incident acoustic signals away from the beam between the transducers. Ultrasonic signals are generated simultaneously by two phase-opposed transducers and are detected in a time-windowed fashion in which the time window excludes extraneous reflected signals that have a longer path length.

12 Claims, 3 Drawing Sheets

ENHANCED VORTEX-SHEDDING FLOWMETER

BACKGROUND OF THE INVENTION

This invention relates to vortex shedding flowmeters and in particular to low cost flowmeters which must respond reliably over a wide range of flow rates.

BACKGROUND INFORMATION

The reader is directed to U.S. Pat. No. 4,297,898 by Hertzl, the disclosure of which is included herein by reference.

In U.S. Pat. No. 4,297,898, Hertzl describes an arrangement for detecting amplitude modulations of ultrasonic signals that pass through and interact with vortices generated by a set of obstacles. Such detection methods, though possible, have difficulties which limit the overall performance of the flowmeters. For example, the ultrasonic signal path is significantly blocked by the mechanical structure used to generate the vortices. Moreover, portions of the acoustic signal path extend outside the vortex generating structure so as to diminish the relative modulation effect of the vortices. In addition, reflections of ultrasonic signals from the vortex-generating structure may interfere with reliable detection of the modulation. The net effect is a relatively small detected flow rate signal, particularly at low flows.

BRIEF SUMMARY OF THE INVENTION

Preferred embodiments of the invention use modified forms of the vortex generating structure described in Hertzl's U.S. Pat. No. 4,297,898. Some such embodiments use phase modulation of acoustic energy by the vortices to obtain an output frequency accurately related to flow rate.

In general, Herzl's ultrasonic sensing structure is modified to have some of the obstacles' surfaces, which are in the acoustic energy path, angled so that acoustic energy reflected from the vortex-generating structure is not included when the modulation is detected. That energy is instead deflected generally along the axis of the sensor so that it cannot affect detection of the vortices. Moreover, the reflected signals may be delayed because of the greater distance traveled, so they can be electronically rejected by not falling within a selected time window. The detection of acoustic modulation can then proceed to yield a relatively high quality output signal that, in some embodiments of the invention, allows for a turn-down ratio (i.e., maximum measurable flow rate divided by minimum measurable flow rate) of thirty. Prior art vortex-shedding flowmeters generally have a turn-down ratio of about fifteen.

Thus, one of the objectives of the present invention is to overcome or reduce difficulties inherent in Herzl's teachings when using ultrasonic detection means and thereby enable a better flow meter to be produced. A preferred ultrasonic method operates over a relatively wide range of flow rates compared to the pressure or thermal detection methods that are also usable with Hertzl's vortex-generating structure and which are either low flow or high flow rate limited respectively.

One aspect of the invention is that it provides a vortex-shedding flowmeter comprising a flow tube, an elongated upstream obstacle disposed within the flow tube, a downstream obstacle comprising two members that are parallel to each other and to the upstream obstacle, and at least one acoustic transducer operable, when the flowmeter is in operation, to project an acoustic signal along a path transverse to the flow axis. In this flowmeter a bluff upstream face of the upstream obstacle is perpendicular to the flow axis and a shape of the upstream obstacle is selected so that no surface of the upstream obstacle is parallel to a flow axis. Correspondingly, the two members of the downstream obstacle are spaced apart from the upstream obstacle along the flow axis by a selected distance and both of the two members of the downstream obstacle have a shape selected so that no surface of either member is parallel to the flow axis.

Another aspect of the invention is that it provides a vortex-shedding flowmeter comprising an elongated upstream obstacle disposed perpendicular to a flow axis and a downstream obstacle comprising two mutually parallel elongated members disposed parallel to the upstream obstacle and spaced apart from the upstream obstacle by a selected distance along the flow axis. In this sort of flowmeter the upstream obstacle and both members of the downstream obstacle comprise respective triangular prisms oriented so that a respective face of each of the prisms is perpendicular to the flow axis.

Yet another aspect of the invention is that it provides a vortex-shedding flowmeter comprising a flow tube; an upstream obstacle disposed within the flow tube so that a bluff upstream face of the upstream obstacle is perpendicular to a flow axis; a downstream obstacle comprising two members that are parallel to each other and to the upstream obstacle; two acoustic transducers facing each other along a path transverse to the flow axis; and a signal processing circuit. In this flowmeter each of the transducers is operable to simultaneously project a respective phase-opposed acoustic signal along the path at a first time, to subsequently receive the acoustic signal projected by the other of the transducers and to then input the respective received signal to the signal processing circuit.

A preferred ultrasonic detecting signal processing circuit detects phase modulation in an acoustic beam that has been acted upon in the process of generating the vortices. In a preferred embodiment, short bursts of acoustic energy are transmitted from one transducer to another and, when received, are converted to electrical signals which are phase compared to each other to extract the phase modulation signal that is then refined to provide the output frequency representative of the fluid flow rate. When the circuit is operated this way the transmitted and received acoustic signals reinforce each other so that high detection sensitivity is obtained. Another preferred signal processing circuit comprises a switch operable to short the two transducers together at a selected time subsequent to simultaneous signal pulsing in order to quickly dissipate the residual energy from their transmissions and prepare them for reception.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1:
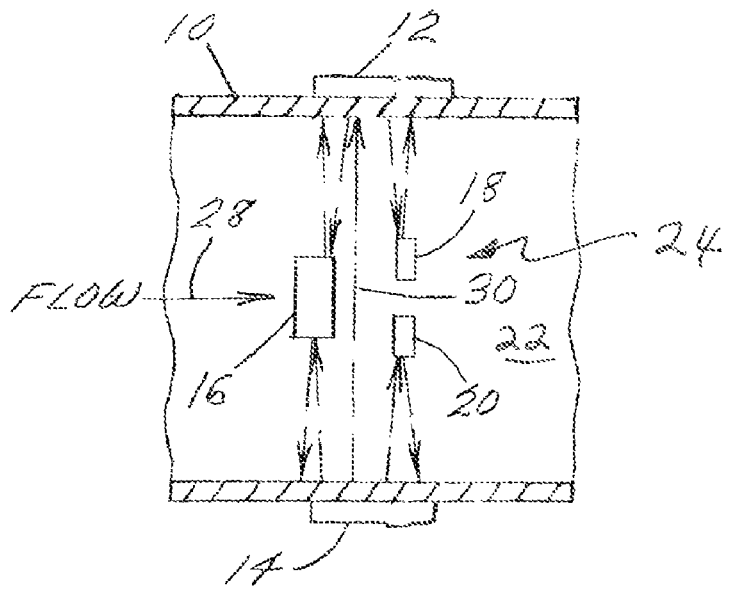
FIG. 1 is a schematic top cross-sectional depiction of a vortex-generating portion of a prior art flow meter.

Referring now to FIG. 1, one finds a schematic cross-sectional depiction of a sensing head portion of a prior art flow meter described by Hertzl in U.S. Pat. No. 4,297,898. Fluid 22 flowing from an upstream end of the vortex generator to a downstream end along a flow axis 28 impinges on an upstream face of an upstream obstacle or bluff body 16 and continues to flow past a downstream obstacle 24 comprising a pair of parallel members 18, 20 to produce the stabilized vortex modulated flow taught by Hertzl. The flow sensor body 10, when in use, contains the flowing fluid 22 and has ultrasonic transducers 12, 14 mounted on it and used for detecting vortex-induced modulation.

An acoustic transmission (depicted as an arrowed dashed line) 30 is produced by a first transducer 14 and directed across the flow axis 28 towards a second transducer 12. The ultrasonic transmission has a certain amount of spread along its path so that portions 30a of the signal are reflected from the surfaces of both the upstream 16 and downstream obstacles 20. These reflected signals may subsequently reflect off the pipe wall several times before becoming sufficiently attenuated so as to be insignificant.

The most effective vortex generating structures taught by Herzl used long straight members oriented perpendicular to the flow axis 28 and having flat upstream surfaces. The thickness of the obstacle members, measured along the flow axis, was chosen to be great enough to resist bending when the obstacle member was exposed to the highest flow rate to be measured. Thus, the preferred obstacle members taught by Herzl were rods having a rectangular cross section with wider faces facing upstream and downstream and narrower, but still appreciably long, lateral faces oriented along the flow direction. However, when using ultrasonic detection, acoustic reflections from the lateral faces interfere with measurement of signals propagating along a direct acoustic path between the transducers and limits both the accuracy and the flow velocity range of Herzl's instrument.

Signals usable by a vortex shedding measurement are generated only by interaction of vortices with acoustic transmissions passing directly from one transducer to the other. All reflections tend to dilute the effects of the vortices and may even add further instabilities and errors. It is therefore desirable to reduce the reflected signals and increase the sensitivity of the ultrasonic detection arrangement as much as possible. Both structural and electronic arrangements for doing this are addressed by the invention and are described below.

Generally speaking, in preferred embodiments of the invention the shapes of the upstream 16 and downstream 24 obstacles are selected to direct acoustic reflections from these surfaces away from the intended acoustic signal path. That is, the shapes of both obstacles are selected so as to avoid lateral faces extending along the flow axis. Correspondingly, electronic time-windowing approaches are used in preferred embodiments in order to process only those acoustic signals travelling along the intended signal path while disregarding reflected signals having a longer path length and arriving later than the desired signals. The time-windowing approach preferably uses acoustic transmissions generated in short bursts and receivable within a narrow reception window. The additional time required for an undesired reflected signal to appear at a detector allows for time-windowing approaches in which the electronic circuits are non-receptive when the extraneous signals arrive.

Figure 2:
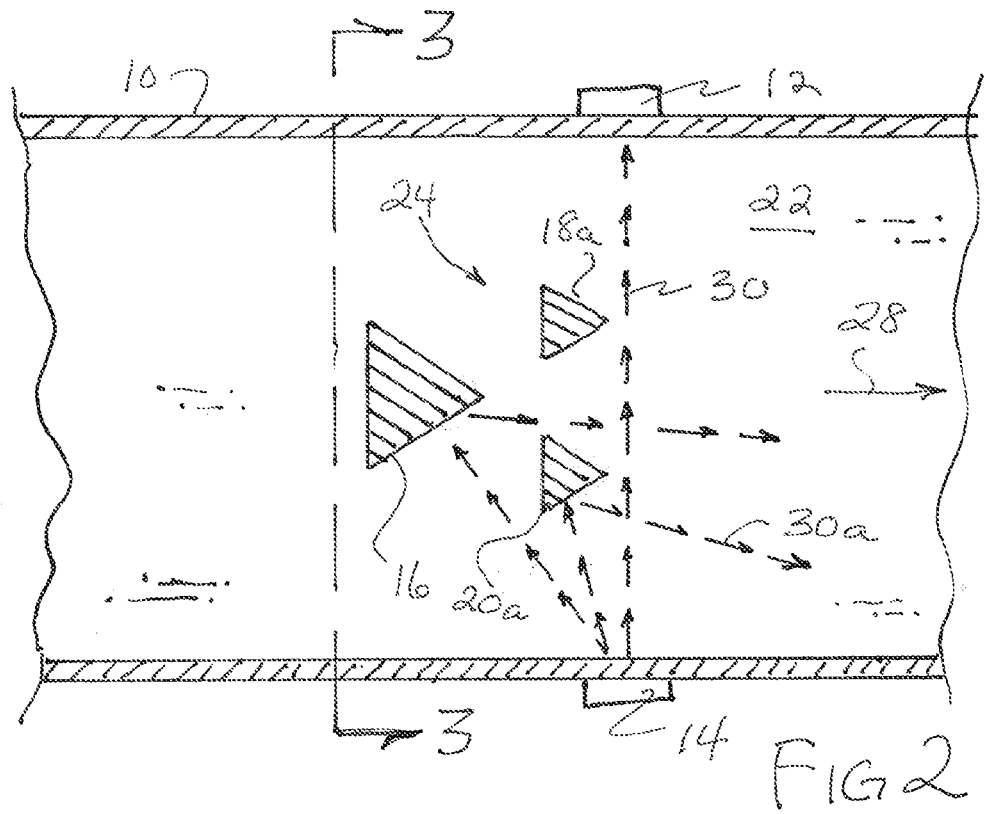
FIG. 2 is a schematic top cross-sectional depiction of a vortex-generating portion of an embodiment of a flow meter of the invention.

Turning now to FIG. 2, one finds a schematic depiction of a sensing head portion 10 of a flow meter of the invention in which an ultrasonic transducer pair 12, 14 is positioned to generate acoustic transmission paths 30 transverse to the flow direction in the vicinity of upstream 16a and downstream 24 obstacles. Both the upstream obstacle 16a and the two members 18a, 20a comprising the downstream obstacle 24 have lateral surfaces skewed with respect to the flow axis.

Figure 3:
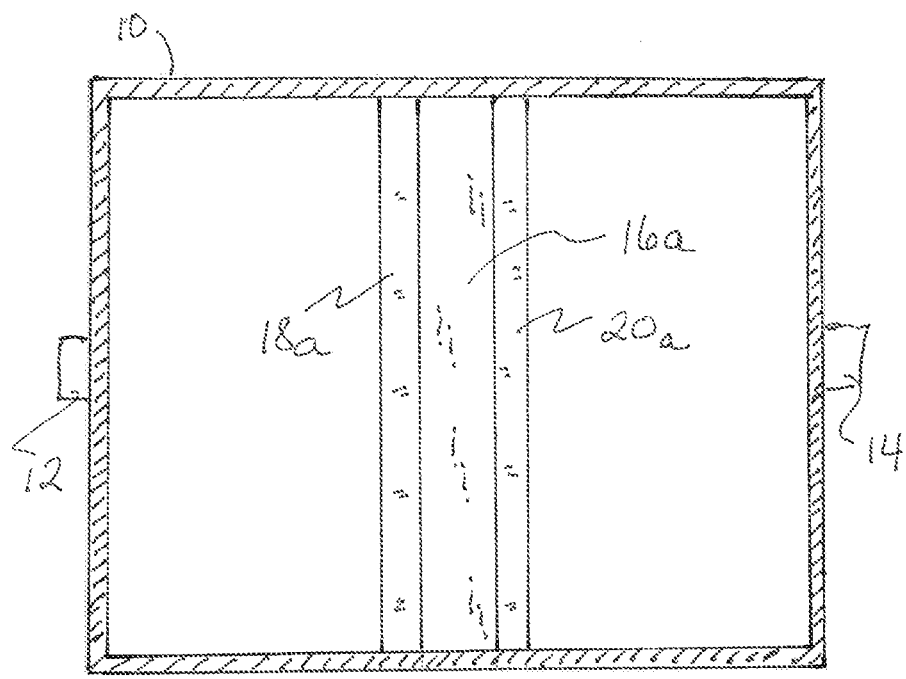
FIG. 3 is a cross-sectional view of the apparatus of FIG. 2, the view taken as indicated by the arrow 3-3 in FIG. 2

In the embodiment depicted in FIGS. 2 and 3 the upstream obstacle 16a and downstream obstacle members 18a, 20a all comprise prismatic rods having triangular cross-sections. The reader should appreciate that many other non-rectangular shapes, such as concave curved lateral surfaces downstream of a vortex-generating upstream surface may be employed in practicing the invention. Moreover, the invention is not limited to having the transducers 12, 14 set at a particular axial position relative to the obstacles. A range of such positions may extend at least from a position immediately downstream of the upstream obstacle to a position immediately downstream of the second obstacle 24.

The skilled reader will appreciate that many sorts of ultrasonic transducer mounting arrangements are known in the art. Although the drawing shows transducers mounted on the outside of a flow sensor body, the invention is not so limited and encompasses known arrangements for mounting transducers within a flow sensor body or protruding through the walls of the flow sensor body.

Moreover, although the preferred embodiment employs pairs of transducers operated to measure vortex-induced phase changes, the reader will recognize that it is not so limited. Other arrangements using one or more acoustic transducers operating along a defined signal path could be used. These comprise, without limit, arrangements usable for measuring vortex-induced amplitude changes and for measuring vortex-induced changes in transit times.

The use of a rectangular cross section flow passage with the vortex-generating obstacles centrally located therein, as depicted in FIG. 3, provides a constant fluid environment for the generation of vortices over the full length of the bluff body 16. The vortices produced at the edges of the bluff body have spiral geometry and resemble long jellyrolls. Because each of the vortex-generating edges is parallel to walls of the preferred flow passage, the magnitude and phase of these vortices are constant along the length of the bluff body. Hence, the magnitude and purity of the vortices are optimized so that they may be detected with highest precision. This is particularly important for low fluid flow rates where the magnitude of the vortices is relatively low and measurements may be easily corrupted by extraneously generated vortices and distorted fluid flows.

One may note that although a rectangular flow passage is preferred, many other shapes may be considered. Many of these pose additional problems. For example, a circular flow passage imposes problems in vortex generation and uniformity. The distance between a point on the edge of a bluff body to the adjacent wall of the passage changes from a maximum at the center of a circular pipe to a minimum at either end of the bluff body. This tends to produce smaller vortices. Furthermore, without the flow conditioning provided by the relatively long straight walls, the vortex generation and detection is more subject to degradation by distorted fluid flows.

Figure 5:
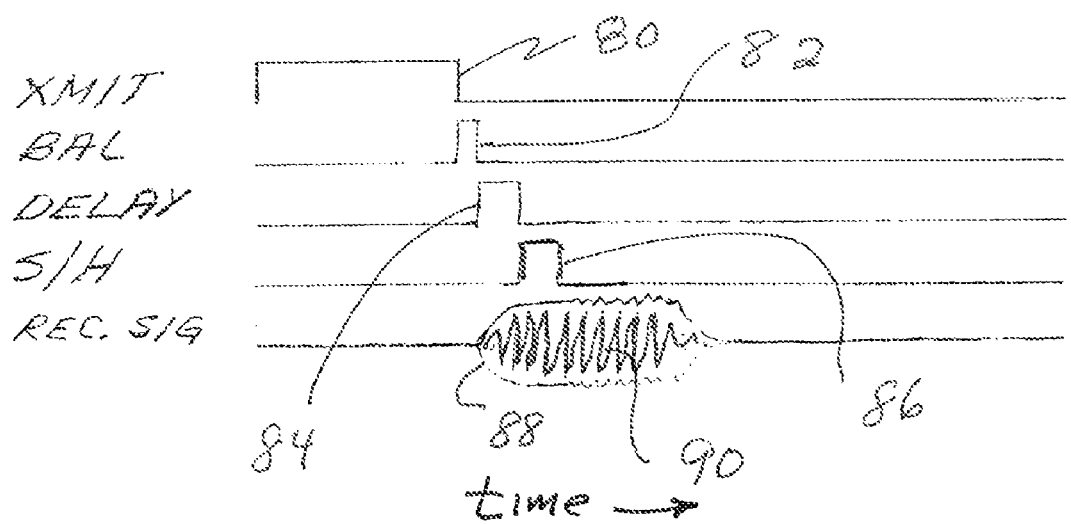
FIG. 5 is a signal timing diagram.
Figure 4:
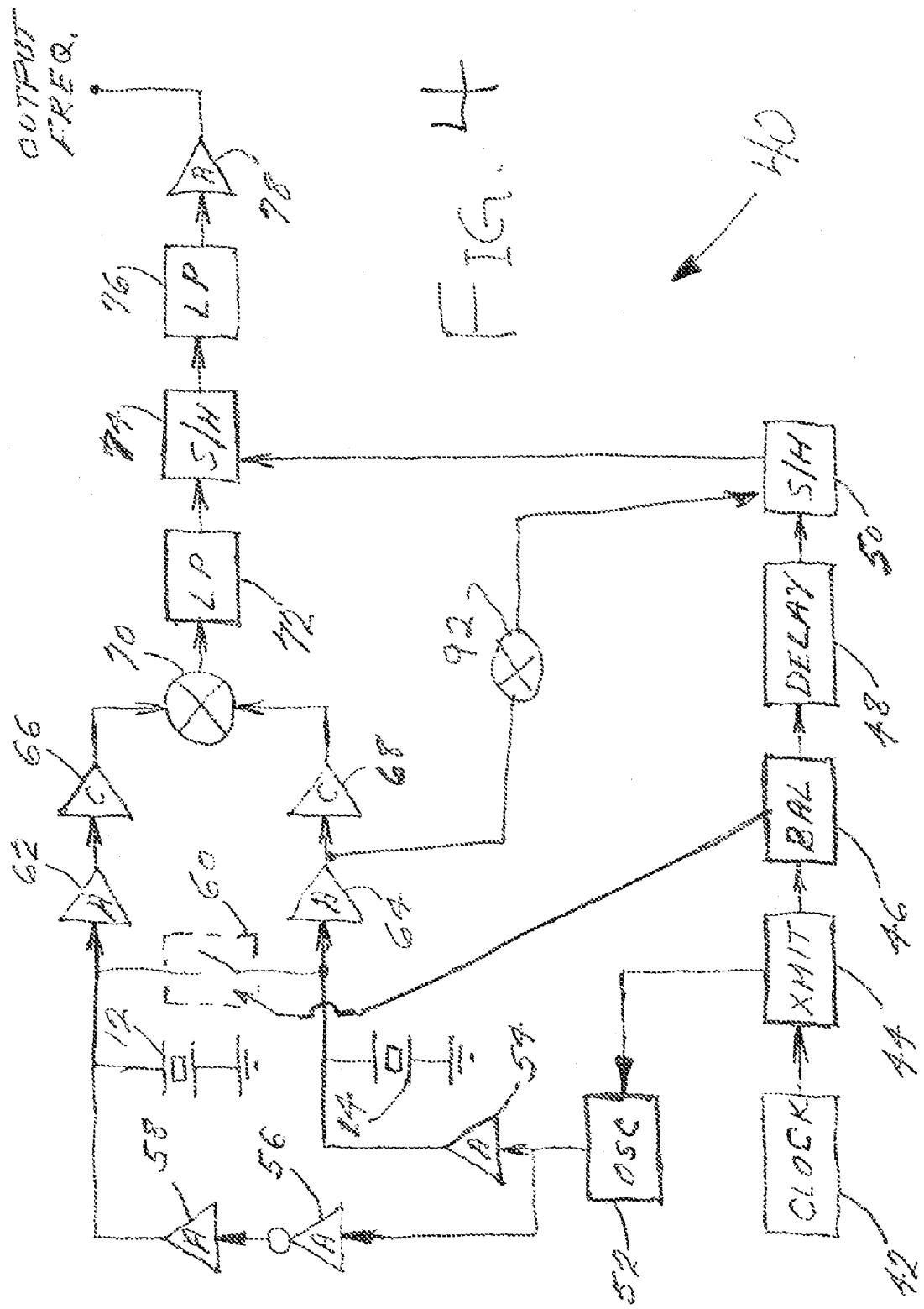
FIG. 4 is a schematic diagram of a preferred signal processing circuit.

FIG. 4 provides a simplified block diagram 40 of a preferred electronic circuit suitable for phase-detecting modulations produced by vortices in accordance with the present invention. An associated timing diagram is shown in FIG. 5. The reader may note that although a phase detection approach is preferred, other approaches to modulation detection are generally well known and include, without limitation, amplitude detection approaches.

When the circuit of FIG. 4 is used with a flowmeter having a 1.049" bore for measuring the flow of water at room temperature the clock 42 provides trigger pulses selected to be spaced 100 microseconds apart. The clock pulses are input to a transmit timer 44 which enables the carrier oscillator 52 and the transducer amplifiers 54 and 58. This energizes both transducers 12, 14 simultaneously for a period that is less than the acoustic transit time across the bore (e.g., eighteen microseconds). An inverter 56 inverts the signal provided to one of the transducers 12 through the transducer amplifier 58, so that the two transducers transmit their signals 180 degrees out of phase. After the enabled pulse has been completed, the outputs of the transducer amplifiers 54, 58 assume a high impedance state to avoid loading the transducers during signal reception.

The trailing edge of a pulse from the transmit timer 44 triggers a balance timer 46 which closes a switch 60 to short the two transducers together for a brief time (e.g., two microseconds) in order to quickly dissipate the energy remaining from the transmitting operation before receiving the acoustic signals. This enables the circuit to begin receiving promptly after transmission so that the desired acoustic signals can be received with minimal distortion before receiving signals that have been corrupted by reflections that have traveled over longer path lengths.

In a preferred embodiment the carrier signals energizing the two transducers are 180 degrees out of phase so that the acoustic signals sum in a push-pull manner to produce a much larger acoustic signal than if only a single transducer were transmitting at a time. The magnitude of the acoustic signals received by the transducers is thereby enhanced. The detection sensitivity of the modulation is also increased because a phase change signal from vortex modulation detected in one direction is also detected in the opposite direction, and the difference in phase between the two signals ultimately produces the output signal.

The received signals are amplified by respective receiving amplifiers 62, 64 and are squared up by respective comparators 66, 68 before entering a phase detector 70, which is typically a SR flip-flop. The output from the phase detector 70 is filtered by a filter circuit 72 to remove carrier components and is then input to a sample and hold circuit 74. The sample and hold 74 is enabled, after a delay controlled by a delay timer 48, by the sample and hold timer 50. The output from the sample and hold 74 passes through a low pass filter 76 to remove clock frequency components and then enters an output amplifier 78 to provide a frequency output representative of flow rate.

The timing diagram of FIG. 5 schematically depicts timing signals for transmit 80, balance 82, delay 84 and sample and hold 86 functions. In addition, the figure depicts a received signal envelope 88. The magnitude of an initial portion of the received signal (on the left side) is smooth, indicating good signal purity. The remainder of the received signal has ripples 90 from reflected signals. It should be noted that the ripples depicted in the figure are exaggerated and although possibly not observable with an oscilloscope, may, when compared to the also very small but usually observable desired modulation, constitute a source of error. The sample and hold timing 86 determines a frequency output signal provided by the meter and is set to capture only the least corrupted portion of the detected signal (typically on the left side as shown) and to disregard the other portions of that signal. The delay is set for the optimum sample and hold timing by using either a fixed setting, assuming that the acoustic transmission times are fairly constant for the meter application, or is set with respect to a detected signal responsive to the leading edge of the received envelope signal. In the latter case at least one of the amplified signals output from one of the amplifiers 62, 64 is amplitude detected by a suitable detector 92 and used to trigger the sample and hold circuit 58. An arrangement of this sort allows one to select an optimum sample timing, which is relative to the leading edge of the signal envelope 88. This is a useful option to compensate for speed of sound variations affecting the sample and hold timing.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A vortex-shedding flowmeter comprising:
   a flow tube having a longitudinal flow axis through which a fluid stream to be metered is conducted from an upstream end of the flow tube to a downstream end thereof when the flowmeter is in operation;
   an elongated upstream obstacle disposed within the flow tube so that a bluff upstream face of the upstream obstacle is perpendicular to the flow axis, a shape of the upstream obstacle selected so that no surface thereof is parallel to the flow axis;
   a downstream obstacle comprising two members that are parallel to each other and to the upstream obstacle, the two members spaced apart from the upstream obstacle along the flow axis by a selected distance, both of the two members of the downstream obstacle having a shape selected so that no surface of either member is parallel to the flow axis; and
   at least one acoustic transducer operable, when the flowmeter is in operation, to project an acoustic signal along a path transverse to the flow axis.

2. The vortex-shedding flowmeter of claim 1 wherein the path transverse to the flow axis is sufficiently close to at least one of the obstacles that a portion of the acoustic signal is reflected therefrom.

3. The vortex-shedding flowmeter of claim 1 wherein the upstream obstacle comprises a triangular prism.

4. The vortex-shedding flowmeter of claim 1 wherein each member of the downstream obstacle comprises a respective triangular prism.

5. The vortex-shedding flowmeter of claim 1 wherein the at least one acoustic transducer comprises two acoustic transducers facing each other along the path transverse to the flow axis, each of the transducers operable to simultaneously project a respective acoustic signal along the path at a first time, to subsequently receive the acoustic signal projected by the other of the transducers and to input the respective received signal to a signal processing circuit operable to determine a phase relation between the two received signals.

6. A vortex-shedding flowmeter comprising an elongated upstream obstacle disposed perpendicular to a flow axis and a downstream obstacle comprising two mutually parallel elongated members disposed parallel to the upstream obstacle and spaced apart therefrom by a selected distance along the flow axis, wherein:

the upstream obstacle and both members of the downstream obstacle comprise respective triangular prisms oriented so that a respective face of each of the prisms is perpendicular to the flow axis.

7. The vortex-shedding flowmeter of claim 6 further comprising at least one acoustic transducer operable, when the flowmeter is in operation, to project an acoustic signal along a path transverse to the flow axis.

8. The vortex-shedding flowmeter of claim 6 further comprising two acoustic transducers facing each other along a path transverse to the flow axis, each of the transducers operable to project a respective acoustic signal along the path, the path sufficiently close to at least one of the obstacles that portions of the acoustic signals are reflected therefrom.

9. A vortex-shedding flowmeter comprising:

a flow tube having a longitudinal flow axis through which a fluid stream to be metered is conducted from an upstream end of the flow tube to a downstream end thereof when the flowmeter is in operation;

an upstream obstacle disposed within the flow tube so that a bluff upstream face of the upstream obstacle is perpendicular to the flow axis;

a downstream obstacle comprising two members that are parallel to each other and to the upstream obstacle, the two members spaced apart from the upstream obstacle along the flow axis by a selected distance;

two acoustic transducers facing each other along a path transverse to the flow axis, the transducers operable to simultaneously project respective acoustic signals that are 180 degrees out of phase along the path at a first time, each transducer operable to subsequently receive the respective acoustic signal projected by the other of the transducers and to input the respective received signal to a signal processing circuit operable to determine a phase relation between the two received signals.

10. The vortex-shedding flowmeter of claim 9 wherein the signal processing circuit further comprises a switch operable to short the two transducers together at a selected time subsequent to the first time.

11. The vortex-shedding flowmeter of claim 9 wherein the flow tube comprises a rectangular cross section flow passage.

12. The vortex-shedding flowmeter of claim 9 wherein the upstream obstacle and each of the two parallel members of the downstream obstacle have respective shapes selected so that no surface of thereof is parallel to the flow axis.

* * * * *